Dec. 17, 1963     A. VOGELSANG     3,114,293
METHOD AND APPARATUS FOR MACHINING FORMING ROLLS
Filed Oct. 26, 1961     2 Sheets-Sheet 1
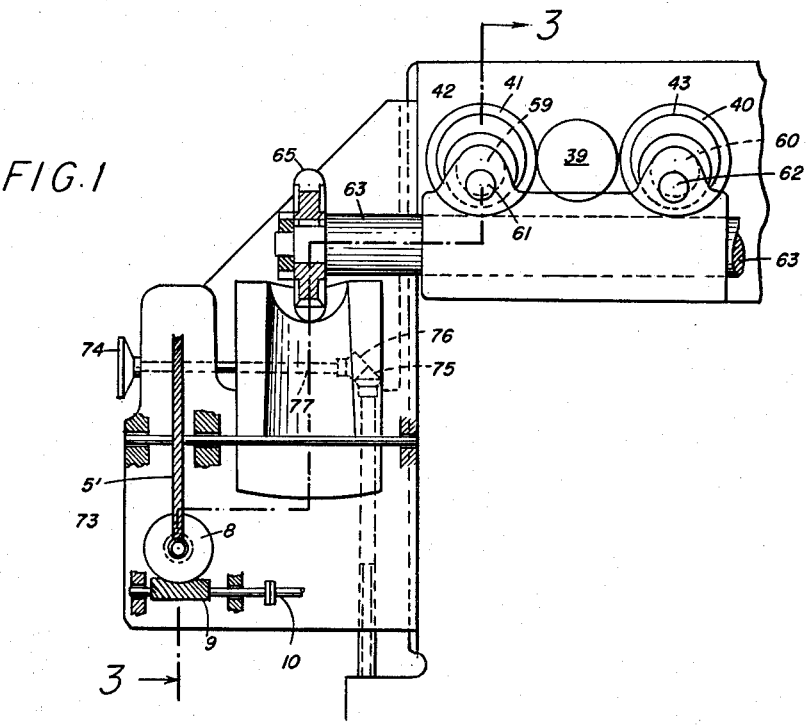
FIG.1
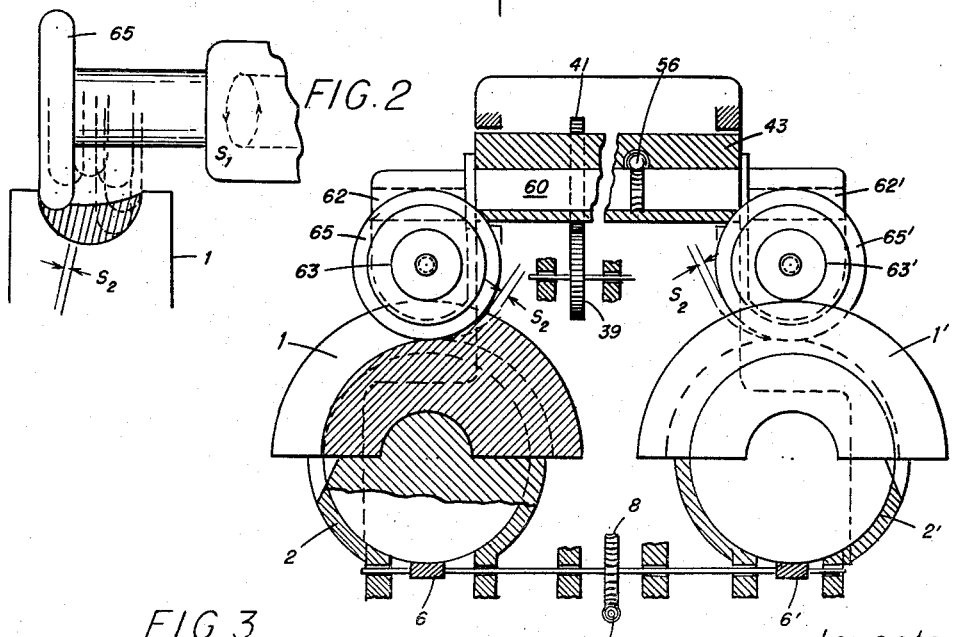
FIG.2
FIG.3
Inventor
Alois Vogelsang
By his attorneys
Howson and Howson

United States Patent Office 3,114,293
Patented Dec. 17, 1963

3,114,293
METHOD AND APPARATUS FOR MACHINING FORMING ROLLS
Alois Vogelsang, Dusseldorf, Germany, assignor to Mannesmann-Meer Aktiengesellschaft, Dusseldorf, Germany
Filed Oct. 26, 1961, Ser. No. 147,982
Claims priority, application Germany Oct. 26, 1960
6 Claims. (Cl. 90—13.4)

The invention is for method and apparatus for machining the passes in forming rolls and more particularly rolls such as are used in cold pilger mills.

Machine tools are already known where the rolls or the dies which form the true pass are held in a clamping device in a position corresponding to the operational arrangement by means of a tool axially located in the roll pass. In this case, the rolls cause the forward motion around their own axis. Variation in cross section is achieved by adjusting the tools radially against the roll shaft, or by a tool which is conically and axially adjustable. Machines are also known where the axially arranged tool is fixed in one geometric plane and where the work-piece turns around the common pass axis at cutting speed, as well as preferred designs where the dies themselves are fixed in one geometric plane and the tools are turned around at cutting speed. In addition, turning devices are known where the dies turn at cutting speed and the tool encircles the contour of the profile in two overlapping feed motions, as, for example, by cross support or by a radial and swinging feed motion.

The disadvantage of the first mentioned design is that the finish grinding of the pre-bored roll passes can only be accomplished by means of grinding stones which are of smaller diameters than the relatively small pass diameter. These very small stones naturally either wear out very fast or require a long operating time.

The disadvantages of the rotating machines are, first that the rolls or the two dies which form a true pass have to be machined one after the other whereby the necessary symmetry cannot be reached or can be reached only with great effort by means of the tools which, in the meantime, have been worn down. In the second place, a tool which is guided against a rotating work-piece, especially a grinding wheel, permits only a relatively small metal cutting.

As a result of the constantly rising demand for increased output from pilger mills, better surface conditions and greater reductions in one pass, the already very expensive completely hardened rolls wear out even quicker than they used to. With the above mentioned known devices, therefore, it is only possible to attain the finish grinding necessary for an economical utilization by the use of long operating time and often a great number of machines.

The basic task of the present invention is to find a method and an apparatus for its execution which not only avoids the disadvantages of the already known processes, but also reaches an economical finish grinding as well as the primary cut into the solid material in a minimum of operating time.

The new method calls for the use of a disc-shaped tool rotating at cutting speed which cuts into the roll rotating at feeding speed, and is characterized in that a semi-circular shaped edge which is guided along the outlines of the profile to be machined is moved both axially to its rotation and diagonally to the longitudinal axis of the profile, for example, in a circular motion.

Thus, the semi-circular shape of the edge hobs into the profile. With each circular motion, the workpiece turns by a fraction of the feed rate within the milling device so that, for example, during the primary cut of the roll the solid material of the roll in front of the rotating tool edge is being cut down in layers according to the feed.

This method has the great advantage that on the one hand, in spite of the smaller feed rate, considerable metal can be cut off due to the large working surface and therefore the operating time is shorter. On the other hand, with a rigidly built machine as required for an economical finish grinding, it is also possible to accomplish the more infrequently required primary cut into the solid material by milling with commercial tools at economically the most favorable operating speed.

According to this invention, the use of equipment to execute this method is provided where the circular motion around the axis is forced on to the tool by means of a shaft mounted in axial stability by a parallel double crank, and where the diameter of the circular motion of the tool edges can be regulated through two each telescoped shafts, such eccentric shafts being adjustable against each other, by means of a roll contour template.

It is further proposed that in the apparatus two roll supports and tool shafts are provided symmetrically on each end of the machine and the eccentric shafts in order to guarantee the simultaneous and symmetric machining of both rolls respectively to form true contours. This results in the further advantage that the machine components wear out evenly.

An example of the novel equipment is shown in the drawings and the method is explained below.

In the drawings, FIG. 1 is a diagrammatic view in side elevation of a part of a machine tool for machining pilger machine rolls made in accordance with the invention;

FIG. 2 is a view on an enlarged scale of the cutting tool showing the cutting method employed in the apparatus of FIG. 1;

FIG. 3 is a view across the front of the machine of FIG. 1, the sectional portions being taken on the line 3—3 of FIG. 1 showing the cutting plane.

Figure 4:
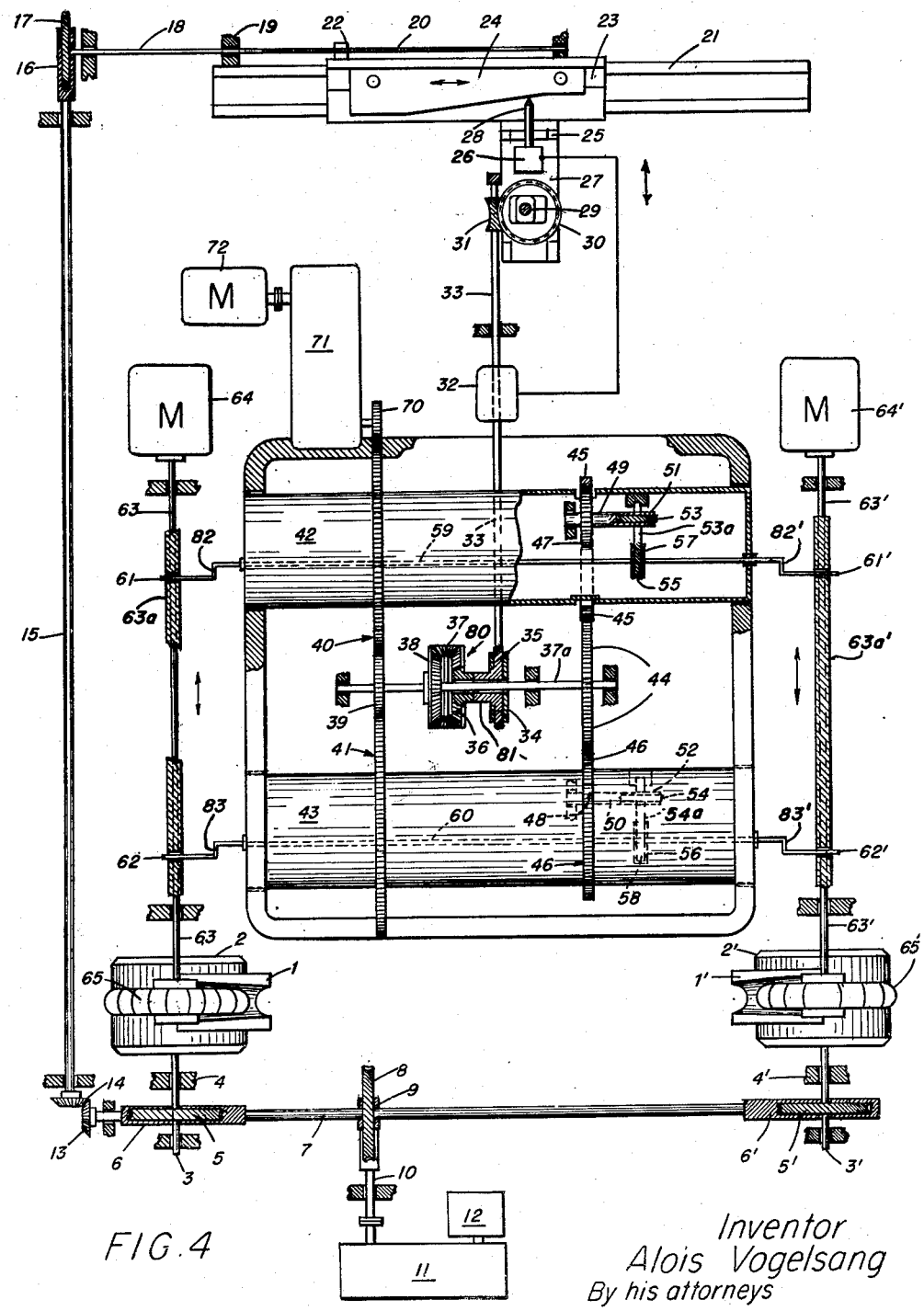
FIG. 4 is a schematic diagram in plan of the entire machine of FIG. 1 showing the cutting means.

The rolls 1, 1' are received and secured in receiving devices 2, 2' each carried by one of the roll shafts 3, 3'. The shafts are mounted in bearings 4. The word "roll" is used for cylindrically-shaped rolling mill tools in which, for the purpose of cold-rolling tubes, bars and the like, there is cut in the peripheral surface of the said tubes, bars and the like a roll pass around the circumference of each piece of such stock. Firmly connected to the roll shafts 3, 3' to rotate the rolls are worm wheels 5, 5'. These wheels receive their rotating motion from worms 6, 6' and worm shaft 7. Connected with worm shaft 7 is a worm wheel 8 driven through worm 9. This worm 9 is connected with worm shaft 10 to a control drive 11 and drive motor 12.

Also driven by worm shaft 7 is a pair of bevel gears 13, 14. These latter bevel gears 13, 14, acting through a shaft 15 which carries gear 14, a worm 16, a worm wheel 17 and a shaft 18, drive a threaded spindle 20. This spindle is carried in fixed bearings 19. By means of a spindle nut 22, the spindle 20 guides a contour template carrier 23 on guide ways 21 in a constant relationship to the roll shafts 3, 3'. Mounted on the template carrier 23 is a template 24 whose form corresponds to the final roll pass shape desired in the rolls.

In order to superpose the indications of template 24 on the cutting tool mechanism hereinafter described, the following feeler control mechanism is provided. On a fixed mounting 25 is an electric control or center box 26. This control center 26 is carried by a slide 27 movable on the mounting 25 and has projecting from it into contact with the template 24, an electric feeler 28.

When the feeler 28 is contacted by the template 24 it closes a circuit in the center 26. In this circuit is a drive servo motor 32 whose function will be set forth below. In a transverse slot in the slide 27 is a collar or slide guide 30 through which passes a center shaft 29 standing at right angles to the slide and the guide. This center shaft 29 is driven by the servo motor 32 by a shaft 33 through a worm and gear 31. As shown in FIG. 4, the shaft 33 not only extends toward the feeler from the motor but through the motor in the opposite direction toward a differential shown generally by the arrow 80. At the differential 80 the worm 34 is disposed on the shaft 33, and there are disposed in the differential a ring wheel 35 for the worm and a drive bevel gear wheel 36 (differential side gear). The ring wheel and the drive bevel gear wheel are mounted on hollow shaft 81, in which the shaft 37a of the differential spider is arranged in a supporting manner. This drive bevel gear wheel 36 is in engagement with the differential spider planetary gear wheels (spider pinions) 37, which are mounted on the differential spider so that they are able to rotate. These differential spider planetary gear wheels are driven at the other side by the drive bevel gear wheel 38. On the shaft carrying the bevel gear 38 is an intermediate gear wheel 39 driven by a gear 40, a driving pinion 70, an infinitely variable gear 71 and a drive motor 72 (see FIG. 4).

This drive motor 72 serves to drive the main rotatating drum 42 to which the gear 40 is connected. It also drives the main drum 43 simultaneously by a gear wheel 41 turning with the drum 43 and meshing with the gear 39 (see FIGS. 1 and 4). Extending across the machine are two rotating hollow drums 42, 43 which are the basic axes of rotation. Eccentrically mounted in each drum is a crankshaft, which carries at each of its ends which extend out of both sides of the drum a crankpin 61, 62; 61', 62' (FIGS. 1 and 4). The crankshaft in the drum 42 is designated by 59, and the one in the drum 43 by 60. The crank arms of these crankshafts 59, 60 are the same length as the distance of the eccentric mounting of the crankshafts is from the centers of the drums 42 and 43. By means of the swings of the crankshafts relative to the drums, as is explained below, it is possible to adjust, in an infinitely variable manner, the length of the crank arms from a minimum of zero, for example, up to a maximum value. These crank arms are designated by 82, 82' for the crankshaft 59, and 83, 83' for the crankshaft 60. Upon the crankshafts are fastened the worm wheels 57 and 58, which are in engagement with the worms 55 and 56. These worms are part of the shafts 53a and 54a, which are mounted immovably in the drums 42 and 43, and which at the same time carry the worm wheels 53 and 54.

The shaft 37a also carries the differential spider, on which are mounted so that they are able to rotate said spider planetary wheels (spider pinions) 37. On each side of the machine, on the crankpins of the crankshafts 59, 60 fitted through the machine is a parallel double-crank drive terminating over the rolls 1, 1' in cutting tools. During the drive of the drums 42 and 43, each point of each cutting tool moves along a circular path, whose diameter is determined by the position of the crankpins on the crankshafts 59, 60 relative to the drums 42, 43.

The cutting apparatus includes frame elements 63a, 63a' in which are mounted shafts 63 and 63'. These shafts are driven at one end by a separate motor for each of them, which motors 64, 64' turn the tools 65, 65' respectively, with the speed necessary for the machining operation. These motors and frames are suspended from the crankpins 61, 61'; 62, 62'. At the opposite end of the shafts 63, 63' there are attached the cutting tools, for example, disk-type milling cutters or grinding wheels 65, 65'. The operative surface thereof at their periphery is made semicircular.

In accordance with the invention, the shafts 63, 63' are parallel to the axis of rotation of the rolls 1, 1' that are to be machined.

The method of operation of the machine will now be described.

The disk-type tools turn at a speed suitable for the machining operation. The rolls 1, 1' that are to be machined are each advanced one tooth, by the feed $S_2$ (FIG. 3) relatively to the tools, so that with the crankpins stationary a groove is cut, at a small feed, around the periphery of the roll. With the crankpins turning and with crank arms of unchanged length, each tool describes a circular path transverse to the profile to be cut (FIG. 2).

At this moment the tool goes in substantially parallel to the outermost point of the roll pass that is to be machined, and its semicircular cutting edge cuts the profile line that is sought after in the particular instance. The tool is then advanced into the uncut material with the angular feed 51, so that each point of the semicircular profile comes around once, in succession, to be cut. As a result, after one complete feeding turn of the rolls 1, 1', the passes are completely machined in them.

In the case of roll passes having a cross section that varies along their length, $S_2$ of the crank arms must be adapted to a lower value from feed to feed. This is done through the already described differential, and it is controlled from the template as follows: when the position of the feeler 28 remains unchanged, then the auxiliary drive or servo motor 32 remains stationary. Consequently, the ring wheel 35, through the intermediary of the stationary worm 34, holds the drive bevel gear wheel 36 immovable. The second drive bevel gear wheel 38, however, runs in a fixed relationship to the drums 42, 43 which are set into rotation by the drive 72, 71, 70, 40 and 41. Consequently, the compensating planetary wheels 37 roll between the stationary wheel 36 and the rotating wheel 38, and turn the shaft 37a and the wheel 44, through the differential spider, at half the rotational speed of the wheel 38. The transmission ratio to the gear wheels 45 and 46 is selected so that at the rotary speed produced by the drum speed the spur gears 45 and 46 stand still relatively to the drums. Consequently the wheel 47, and the wheel 48 installed in the drums and the drives following same remain at a standstill.

On the other hand, if the feeler 28 has its axial position changed relatively to the template, then the auxiliary servo-motor 32 is switched in to run in one direction or the other. This now also rotates the previously stationary drive bevel gear wheel 36 of the differential, and there is superposed on the normal rotary speed of the differential spider a supplementary speed. In accordance with this supplementary speed, the spur gears 45 and 46 become displaced relatively to the drums 42 and 43 carrying them. Because of this the wheels 47 and 48 have a rotary motion imparted to them, which through the intermediary of the driving means 49, 50; 51, 52; 53, 54; 55, 56; 57, and 58 displaces the crankshafts 59 and 60 relatively to the drums 42 and 43. Because of this there is an alteration of the amount of eccentricity of the crankpins 61, 61'; 62, 62' and thus of the diameter of the rotary motion of the tools transversely to the axis of the profile to be cut.

It should be noted that the rotating center shaft 29 of the feeler control is eccentrically located identically with the center of the crankshafts. In this way slide 27 is set to the dimensions reached by the eccentric regulation of cranks 61, 61' and 62, 62'. In this way during the rotating motion of the turning drums 42, 43 through worm wheel 35 and the already described mechanical engaging of the wheels connected thereto, an additional motion is obtained through the differential drive and the crankshaft is regulated by one rate through the worm wheels 57, 58. The slide template 24 also moves slide 27 at the same rate so that the feeler 28 interrupts the contact, thus stopping the servo motor 32.

As shown in FIG. 1 there is a front support 73 for the work-piece arranged at the front of the machine in a vertical lengthwise guide. This support can be adjusted to the tool as required by a hand wheel 74 through a pair of bevel wheels 75, 76 and a threaded spindle 77.

What is claimed is:

1. The method of machining passes in forming rolls such as are used in cold pilger machines, comprising rotating a roll at feeding speed on a receiving device, pressing a revolving cutting tool into the workpiece in the rotating roll, in combination with the steps of guiding a semi-circular edge of the revolving cutting tool along the outlines of that profile axially to the rotation of said tool, and simultaneously guiding the semi-circular edge of said tool transversely to the longitudinal axis of the profile to be machined;

whereby each pass so machined varies in cross-section along the length thereof.

2. Apparatus for machining the passes in forming rolls varying in cross section within their length on a roll, a tool adapted to cut the profile to be produced in the roll, an axially immovable shaft carrying the tool, and a parallel double crank adapted to give the tool shaft a circular motion around the profile, in combination with contour template means to regulate the diameter of the circular motion and two telescoped eccentric shafts adjustable against each other adapted to transmit the template guidance to the tool shaft through the double crank.

3. Apparatus for machining the passes in forming rolls according to claim 2 in which there is a differential drive between the two telescoped eccentric shafts to control their adjustment relative to each other.

4. Apparatus for machining the passes in forming rolls according to claim 2 in which there are two rolls, two tools, two axially immovable tool shafts, two eccentric shafts and two double cranks on said shafts, one on each side of the apparatus, in combination with a single template and means adapted to transmit the guidance of the single template to both tool shafts; whereby a simultaneous and symmetric machining of the profiles in the rolls is obtained.

5. Apparatus for machining the passes in forming rolls according to claim 4 in which the single means controlling the template and the rolls includes a threaded spindle to guide the template and a carrier for the template connected to the rolls; whereby a constant relationship is maintained between the carrier and the roll shafts.

6. Apparatus for machining the passes in forming rolls according to claim 2 in which there are two rolls to be machined, one on each side of the apparatus but there being only one template for the entire apparatus and in which there is a differential drive between the two eccentric shafts to control their adjustment relative to each other, in combination with a single means controlling the template and the rolls causing the adjustment of the eccentric shafts to be controlled during rotation of the rolls.

References Cited in the file of this patent

UNITED STATES PATENTS

| | | |
|---|---|---|
| 2,661,661 | Zoll | Dec. 8, 1953 |
| 2,872,852 | Meyer | Feb. 10, 1959 |